United States Patent [19]

Menon

[11] Patent Number: 5,647,028
[45] Date of Patent: Jul. 8, 1997

[54] MASSIVELY PARALLEL IMAGE RESTORATION WITH PRESERVATION OF SHARP BOUNDARIES

[75] Inventor: Murali M. Menon, Watertown, Mass.

[73] Assignee: Massachusetts Institute of Technology, Cambridge, Mass.

[21] Appl. No.: 487,709

[22] Filed: Jun. 7, 1995

Related U.S. Application Data

[63] Continuation of Ser. No. 679,186, Apr. 2, 1991, abandoned.

[51] Int. Cl.⁶ .................................................. G06K 9/40
[52] U.S. Cl. ...................... 382/275; 382/266; 382/305
[58] Field of Search .................................... 382/254, 275, 382/266, 268, 264, 305; 384/775, 574; 348/607

[56] References Cited

U.S. PATENT DOCUMENTS

| 4,734,770 | 3/1988 | Matsuba ................................. | 382/54 |
| 4,761,819 | 8/1988 | Denison et al. ........................ | 382/54 |
| 5,047,968 | 9/1991 | Carrington et al. ................... | 382/54 |

OTHER PUBLICATIONS

Andrews, *Digital Image Restoration : A Survey*, Computer, May 1974, pp. 36–45.

Geman, Stuart et al., "Stochastic Relaxation, Gibbs Distributions, and the Bayesian Restoration of Images", IEEE Transactions on Pattern Analysis and Machine Intelligence, vol. PAMI–6, Nov. 1984, pp. 721–741.

Harris, John G. et al., "Analog Hardware for Detecting Discontinuities in Early Vision", International Journal of Computer Vision, vol. 4, 1990, pp. 211–223.

Liu, Shih–Chii et al., "Generalized Smoothing Networks in Early Vision", IEEE, 1989, pp. 184–191.

*Primary Examiner*—Joseph Mancuso
*Attorney, Agent, or Firm*—Hamilton, Brook, Smith & Reynolds, P.C.

[57] ABSTRACT

An image restoration apparatus for reconstructing an actual image from a measurement field image containing noise, the apparatus including means for storing image data for a restoration field; means for storing the measurement field image; means for solving a dynamical system equation for the image data, wherein the dynamical system equation is based on an energy function for a system made up of a restoration field variable and the measurement field image, wherein the energy function contains a surround term $E_s$ which represents local interactions within the restoration field, and wherein the local interactions are characterized by sigmoid-like functions.

20 Claims, 9 Drawing Sheets

$$E_f = \frac{1}{1+e^{-\beta(x^M_k - x^R_k)^2}} \qquad \text{Eq. 1}$$

$$E_c = \frac{1}{1+e^{-\beta(x^R_k - x^R_j)^2}} \qquad \text{Eq. 2}$$

$$E = E_F + E_S \qquad \text{Eq. 3}$$

$$E_F = \lambda \sum_k \frac{1}{1+e^{-\beta(x^M_k - x^R_k)^2}} \qquad \text{Eq. 4}$$

$$E_S = \sum_k \sum_{j \in N_k} \frac{1}{1+e^{-\beta(x^R_k - x^R_j)^2}} \qquad \text{Eq. 5}$$

$$\frac{\delta \tilde{x}^R}{\delta t} = -\tilde{\nabla} E \qquad \text{Eq. 6}$$

$$\frac{\delta x^R_k}{\delta t} = -\frac{\delta E}{\delta x_k} \qquad \text{Eq. 7}$$

FIG. 3A $$\frac{\delta E}{\delta x^R_k} = \lambda \frac{2\beta(x^R_k - x^M_k)e^{-\beta(x^M_k - x^R_k)^2}}{\left[1 + e^{-\beta(x^M_k - x^R_k)^2}\right]^2} + \sum_{j \in N_k} \frac{2\beta(x^R_k - x^R_j)e^{-\beta(x^R_k - x^R_j)^2}}{\left[1 + e^{-\beta(x^R_k - x^R_j)^2}\right]^2} \quad \text{Eq. 8}$$

$$g_f = \frac{e^{-\beta(x^M_k - x^R_k)^2}}{\left[1 + e^{-\beta(x^M_k - x^R_k)^2}\right]^2} \quad \text{Eq. 9}$$

$$g_{sj} = \frac{e^{-\beta(x^M_k - x^R_j)^2}}{\left[1 + e^{-\beta(x^R_k - x^R_j)^2}\right]^2} \quad \text{Eq. 10}$$

$$0 = \frac{\delta E}{\delta x^R_k} = 2\lambda\beta(\hat{x}^R_k - x^M_k)g_f + \sum_{j \in N_k} 2\beta(\hat{x}^R_k - x^R_j)g_{sj} \quad \text{Eq. 11}$$

FIG. 3B

MASSIVELY PARALLEL IMAGE RESTORATION WITH PRESERVATION OF SHARP BOUNDARIES

RELATED APPLICATION

This application is a continuation of application Ser. No. 08/679,186 filed on Apr. 2, 1991, now abandoned, which is incorporated herein by reference in its entirety.

The Government has rights in this invention pursuant to Contract Number F19628-90-C-0002 awarded by the Department of the Air Force.

BACKGROUND OF THE INVENTION

The invention relates to neural networks and to using neural networks to perform image restoration.

Image restoration refers to a process that attempts to reconstruct or recover an image that has been degraded by using some a priori knowledge, usually about the degradation process. It is to be contrasted to another process commonly referred to as image enhancement. Both share the common goal of trying to improve the image according to some measure of image quality. The former, however, tries to extract what the actual image was from knowledge about the degradation process or from "hints" found within the image itself. The latter tries to make the image more "pleasing" to the human visual system by manipulating it in ways which accentuate the "pleasing" aspects of the image such as, for example, contrast.

SUMMARY OF THE INVENTION

In general, in one aspect, the invention features an image restoration apparatus for reconstructing an actual image from a measurement field image containing noise. The apparatus includes means for storing image data for a restoration field; means for storing the measurement field image; means for solving a dynamical system equation for the image data. The dynamical system equation is based on an energy function for a system made up of a restoration field variable and the measurement field image and the energy function contains a surround term $E_s$ which represents local interactions within the restoration field that are characterized by sigmoid-like functions.

Preferred embodiments include the following features. The sigmoid-like functions have the following form:

$$f(x) = \frac{1}{1 + \exp[-\beta x^n]}$$

where $\beta$ is a gain variable, n equals 2, and x is derived from those locations of the restoration field that participate in a given local interaction. More specifically, $x = x_k - x_j$, where $x_k$ is the value of a pixel at a kth location in the restoration field and $x_j$ is the value of a pixel at a jth location in the restoration field, said jth location being within a local neighborhood of the kth location.

The energy function also contains a field coupling term $E_f$ which represents field interactions between the measurement field image and the restoration field. The field interactions are characterized by sigmoid-like functions. The sigmoid-like functions have the following form:

$$g(x) = \frac{1}{1 + \exp[-\beta y^n]}$$

where n equals 2, $\beta$ is a gain variable, and y is derived from those locations of the restoration field and the measurement field image that participate in a given field interaction. More specifically, $y = y^R_k - y^M_k$, where $y^R_k$ is the value of a pixel at a kth location in the restoration field and $y^M_k$ is the value of a pixel at a kth location in the measurement field image. In addition, the field coupling term includes a field coupling coefficient which controls the amount of coupling between the measurement field image and the restoration field. The field coupling coefficient varies as a function of location within the restoration field.

Also in preferred embodiments, the field coupling term $E_f$ is:

$$\lambda_k \sum_k \frac{1}{1 + \exp[-\beta_1(x_k^M - x_k^R)^2]}$$

and the surround term $E_s$ is:

$$\sum_k \sum_{j \in N_k} \frac{1}{1 + \exp[-\beta_2(x_k^R - x_j^R)^2]}$$

where $\lambda_k$ is a field coupling coefficient specified for a location k, $\beta_1$ and $\beta_2$ are first and second gain variables, $x^M_k$ represents a value for a pixel at location k of the measurement field image, $x^R_k$ represents a value for a pixel at location k of the restoration field, $x^R_j$ represents a value for a pixel at location j of the restoration field, and $N_k$ defines a neighborhood for location k of the restoration field. The field coupling coefficient $\lambda_k$ equals a constant for all values of k.

Furthermore, the restoration field is a single plane of pixel data and the measurement field image is a single plane of image data.

In general, in another aspect, the invention is a method of reconstructing an actual image from a measurement field image containing noise. The reconstruction method includes generating a model of a system which is made up of a restoration field and the measurement field image; defining an energy function for the model, wherein the energy function is characterized by a sensitivity to changes in the restoration field; establishing a dynamical system based upon the energy function, wherein the dynamical system contains at least one gain variable which controls the sensitivity of the energy function; solving the dynamical system for successive values of the restoration field; and during the solving step, adjusting the gain variable based upon feedback derived from a global measure of the state of the dynamical system.

In preferred embodiments, the global measure is derived from the energy function. More specifically, the global measure is proportional to $|\partial E/\partial \beta|^{-1}$, where E is the energy function and $\beta$ is the gain variable. The gain adjusting step adjusts the gain by an amount equal to $\Delta E \cdot |\partial E/\partial \beta|^{-1}$, where E is the energy function The invention, referred to as a Markov Random Field (MRF) restoration, employs an efficient deterministic search algorithm that typically requires less than 200 iterations in a digital computer simulation. The search algorithm contains a self annealing mechanism for adaptively adjusting the rate of gain annealing based upon feedback about the state of the system. The self annealing deterministic technique was found to be substantially faster than stochastic techniques. The algorithm is able to restore images with up to 71% of the pixels corrupted with sensor noise (non-gaussian). Results from simulations indicate that the (MRF) restoration is capable of operating at signal-to-noise ratios 5 to 6 dB lower than with median filtering.

The invention can be applied to a large number of sensor measurements (Doppler, intensity, passive infrared, range, and video sensors) by simply adjusting a single parameter. This is especially relevant for hardware implementation, since a single chip can be used for processing a wide variety of imagery. The invention has a massively parallel architecture with local neighbor interactions and can be implemented on a large parallel computer or a custom analog VLSI chip. Implementation of the invention in analog VLSI would allow video rate restoration of 512×512 pixel images.

Other advantages and features will become apparent from the following description of the preferred embodiment and from the claims.

DESCRIPTION OF THE PREFERRED EMBODIMENTS

Figure 1:
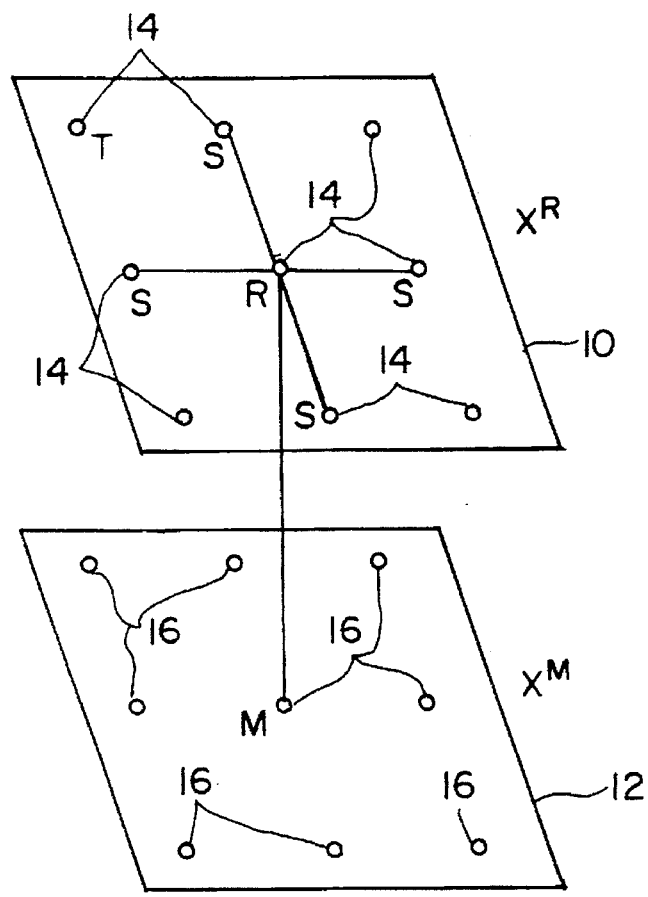
FIG. 1 illustrates the architecture of the system used to generate a restored image.
Figure 4:
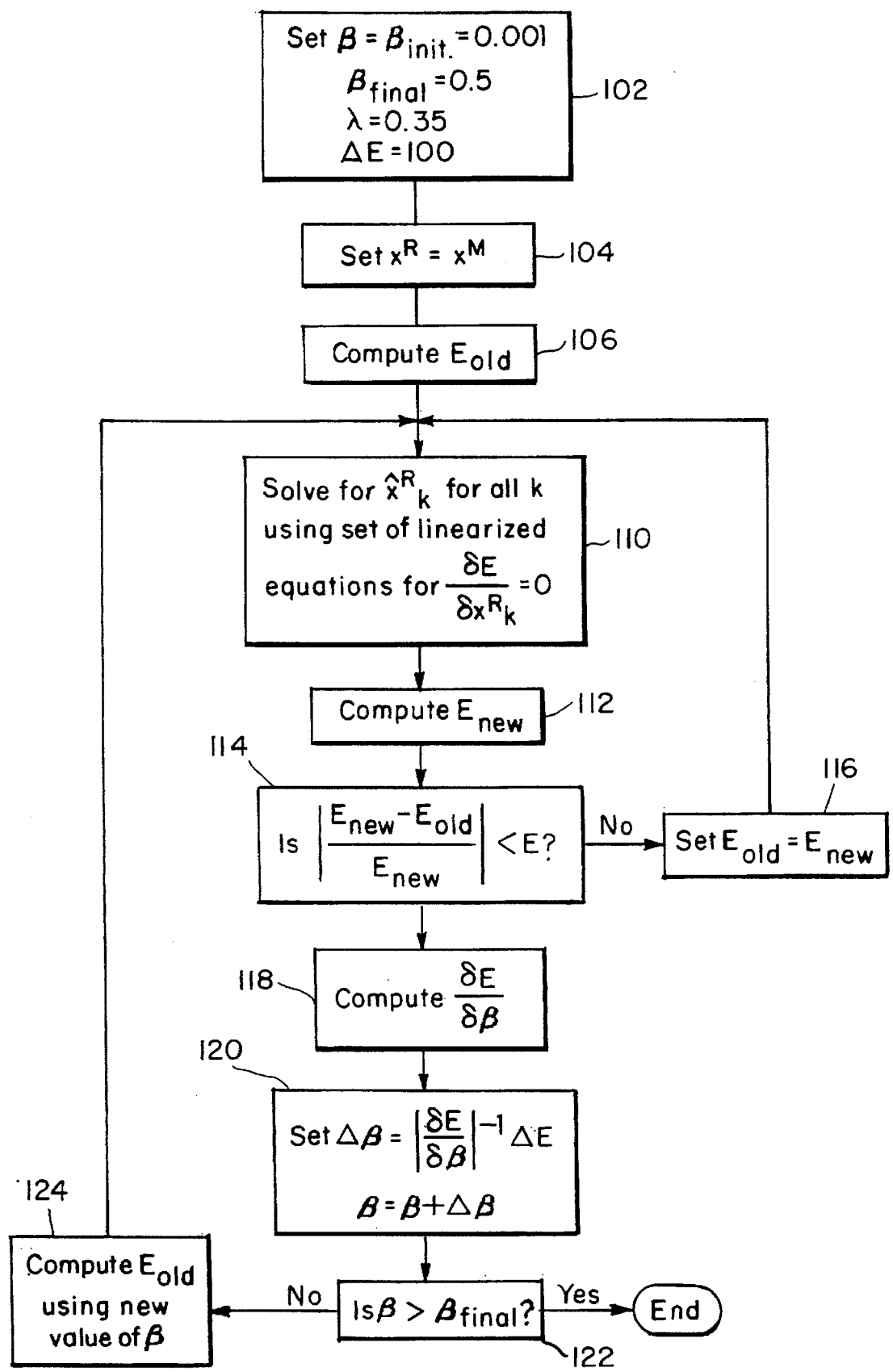
Figure 5:
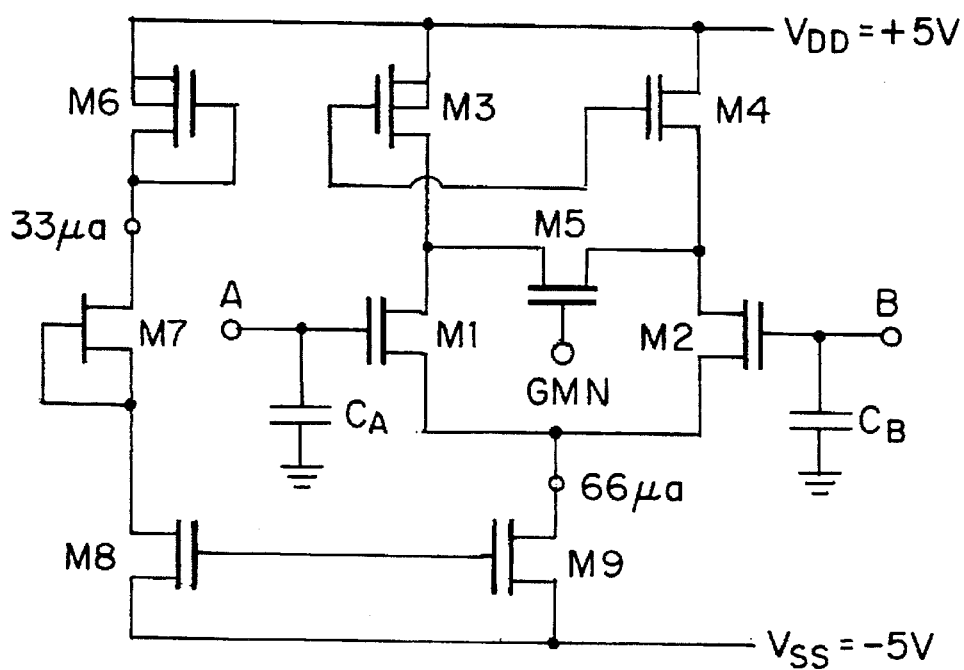
Figure 6:
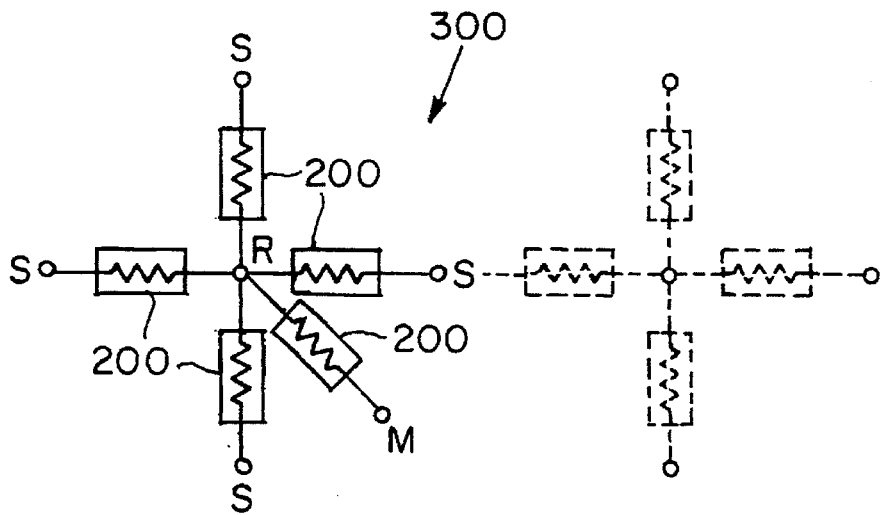
Figure 7:
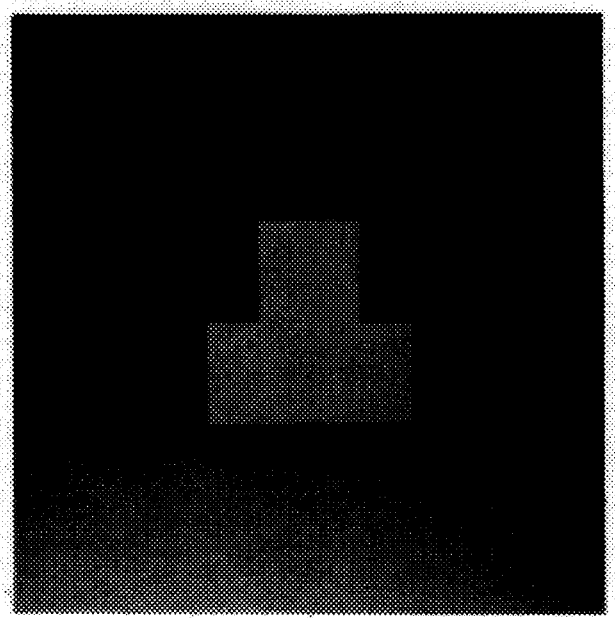
Figure 8:
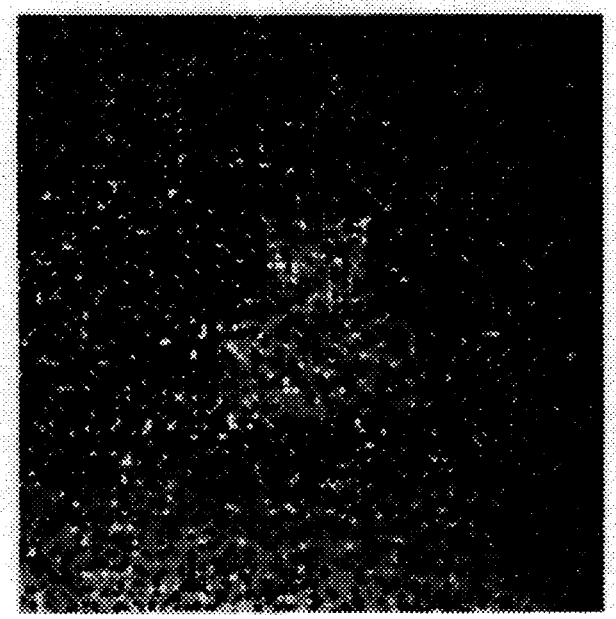
Figure 9:
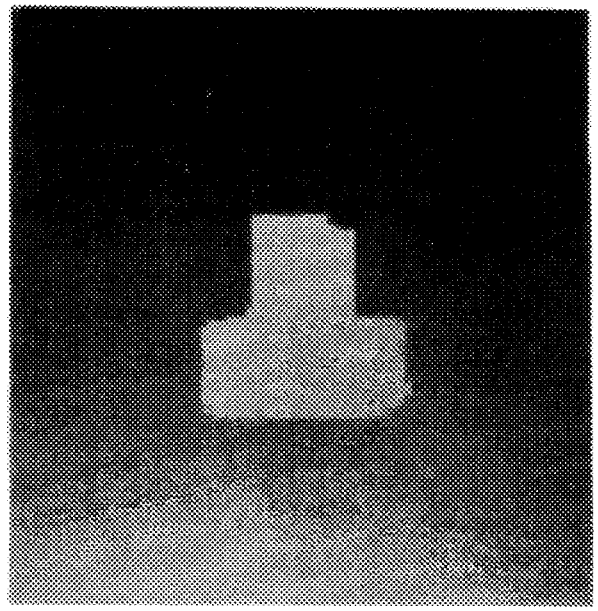
Figure 10:
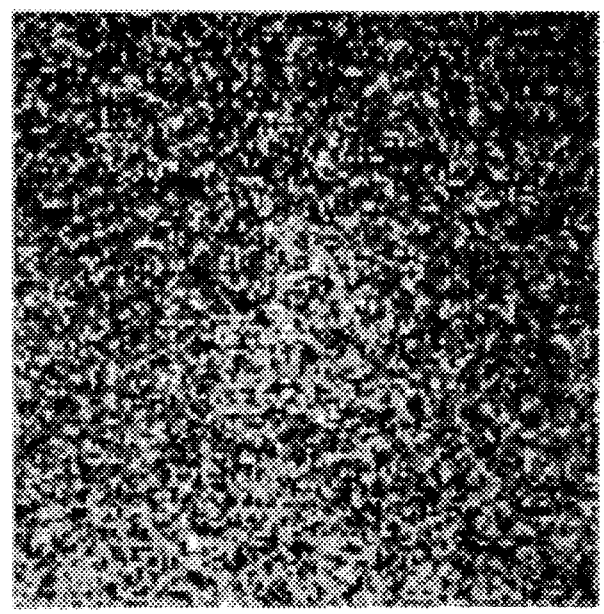
Figure 11:
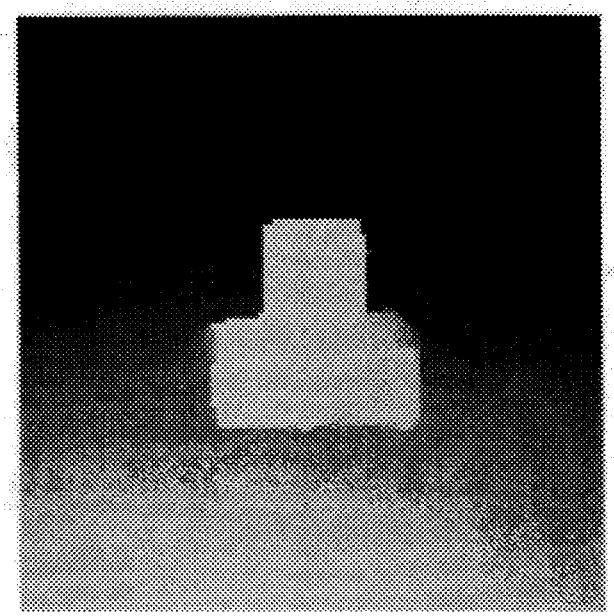
Figure 12:
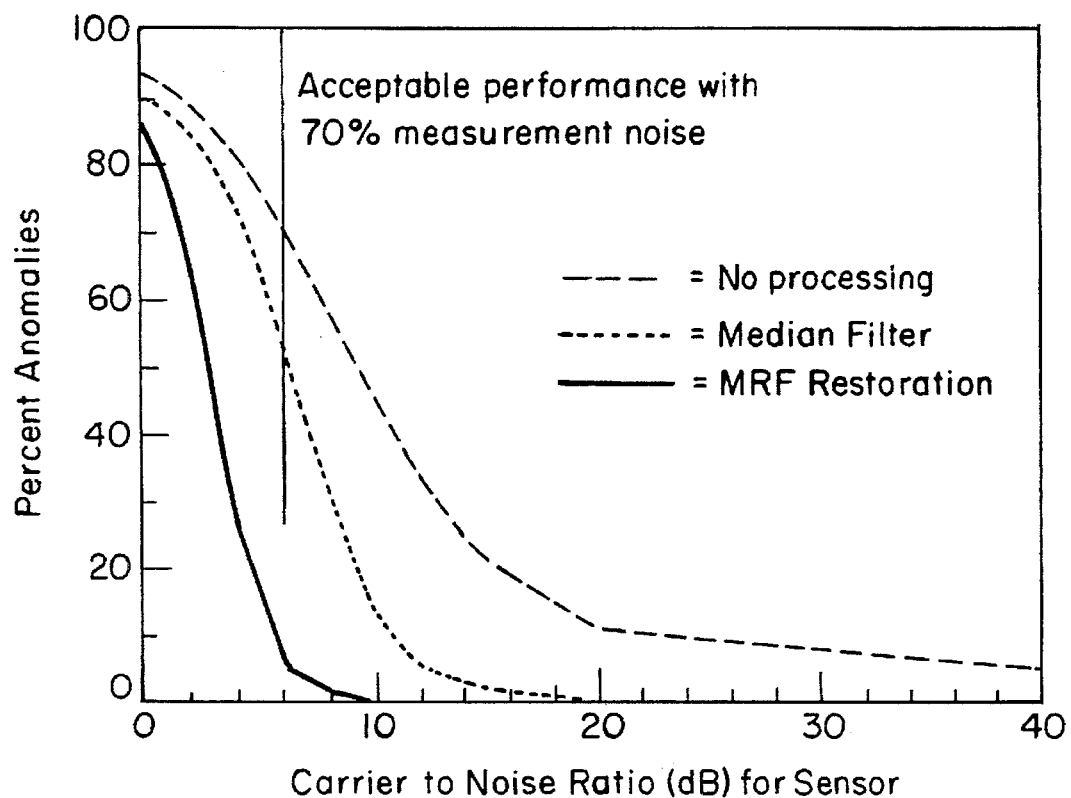

FIGS. 3a–b present equations describing the underlying model;

FIG. 4 is a flow chart of the gradient descent-based deterministic search algorithm used to solve for the $X^R$ which yields a global minimum in the energy function for the system;

FIG. 5 is a circuit which implements the sigmoid function;

FIG. 6 is a circuit which implements the coupling component shown in FIG. 1;

FIG. 7 is an original noise free image containing an object;

FIG. 8 is a simulated range image containing 20% anomalies;

FIG. 9 presents the qualitative results of MRF restoration on a synthetic range image containing 20% anomalies;

FIG. 10 is a simulated range image containing 71% anomalies;

FIG. 11 presents the qualitative results of MRF restoration on a synthetic range image containing 71% anomalies; and FIG. 12 presents the average percent anomalies after MRF restoration as a function of the sensor CNR as compared to median filtering and no processing.

Figure 13:
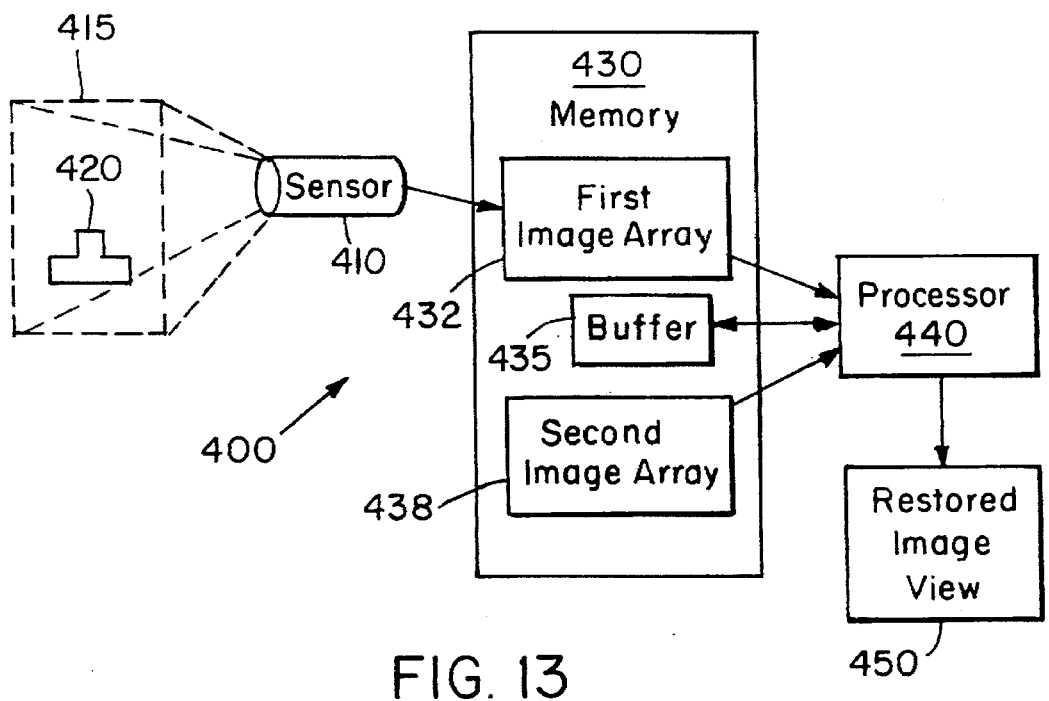

FIG. 13 is a schematic diagram of an image restoration system in accordance with the invention.

Structure and Operation

An image restoration model that quantitatively incorporates prior knowledge of the measurement process and scene will be presented. The model is based on a neural network formulation using Markov Random Fields (MRF's) and sigmoid interactions between pixels. The image restoration method based upon the model performs piecewise smooth restorations on images corrupted with very high noise levels to restore images with sharp boundaries while also providing substantial noise reduction. Because the MRF assumption allows the image to be decoupled into a large number of connected local neighborhoods, the restoration processing is massively parallel in that each neighborhood can be processed independently of the other neighborhoods. The local neighbor information is spread in time such that a global image restoration is effected when the system reaches a steady state. The model is capable of real time image restoration using a parallel SIMD computer such as the Connection Machine, or a direct hardware implementation on a custom VLSI chip. The model will now be described in greater detail.

Referring to FIG. 1, the underlying architecture of the image restoration model includes a measurement field 12 representing a measured image $X^M$ and a restoration field 10 representing a restored image $X^R$, which is to be computed during the restoration process. Both measured image $X^M$ and restored image $X^R$ are presented as arrays of pixels 16 and 14, respectively. Each pixel 16 within measurement field 12 has a corresponding pixel 14 within restoration field 10. Two types of coupling among the pixels 14 and 16 are postulated, namely, a field coupling between each pixel in the measurement field 12 and its corresponding pixel 14 in the restoration field 10 and a surround coupling between each pixel 14 in restoration field 10 and a group of its local neighbors. In FIG. 1, the field coupling is illustrated by the coupling between the pixels labelled "M" and "R" and the surround couplings are illustrated as the couplings in restoration field 10 between the center pixel labelled "R" and the four neighboring pixels labelled "S". Each pair of "R" and "S" is referred to as a pairwise clique. Thus, in the described embodiment there are four pairwise cliques which make up the complete surround coupling.

In the described embodiment, the surround coupling is a zeroth order MRF coupling including only the four nearest neighbors. Other implementations could, of course, use a different number of local neighbors for the surround coupling (i.e., either more or fewer neighbors) and they need not obey any rules of symmetry in the selection of which neighbors are included in the surround coupling. A key requirement is that the surround coupling be local in nature so that the subsequent image restoration computations can be decoupled into a large number of local neighborhoods.

Figure 2:
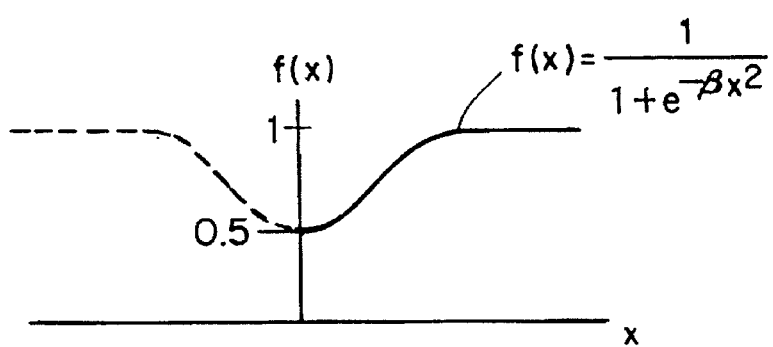
FIG. 2 is the sigmoid function which characterizes the energy contribution of the pixel couplings.

The MRF restoration method involves computing a total energy for a system modeled on the architecture shown in FIG. 1 and then finding the global minimum for that energy function. The contributions to the total energy by the various couplings described above are represented by a sigmoid function of the type shown in FIG. 2. The sigmoid function has the following important features: the function and its first derivative are continuous; it begins with a low value, low sensitivity (i.e., small derivative) lower region followed by a higher sensitivity middle region in which its value rises and it ends with a high value, low sensitivity upper region (i.e., it saturates). Also note that the sensitivity in the middle region of the sigmoid function of FIG. 2 is controlled by $\beta$. In general, any sigmoid-like function, i.e., any function having these characteristics, can be used to represent the energy contributions for the surround couplings described above. The field term need not be sigmoid-like function.

Using the sigmoid function of FIG. 2, the energy contribution $E_f$ of the field coupling and the energy contributation $E_c$ of each pairwise clique of the surround coupling are as specified by Eqs. 1 and 2, respectively, of FIG. 3a. In those equations, $x^M_k$ and $x^R_k$ are the values of the pixel at location k in measurement field 12 and restoration field 10, respectively; and $x^R_j$ is the value of the pixel at location j in the neighborhood associated with the pixel at location k. The total energy contribution of the surround couplings for all of the local neighbors of the pixel at a location k is obtained by summing $E_c$ over the pixels within the neighborhood $N_k$ defined for that pixel.

With the energy contributions of the field coupling and the surround coupling defined as above, the total energy E of the system is simply the sum of each of these contributions over the entire restoration field 10. Thus, E can be expressed as the sum of two terms, namely, a field term $E_f$ and a surround term $E_s$. As shown by Eq. 4 of FIG. 3, $E_f$ is the sum of all of the field couplings over all of the pixel locations of the entire restoration field, i.e., over all k, times a field coupling coefficient $\lambda$. As shown by Eq. 5 in FIG. 3, $E_s$ is the sum of all of the total surround couplings over all of the local neighborhoods $N_k$ in restoration field 10. The field coupling coefficient $\lambda$ is introduced in the field term to control the degree of coupling between the pixels of measurement field 12 and the pixels of restoration field 10,. In this case, the field coupling coefficient $\lambda$ is constant across the entire restoration field and its value may vary between 0, representing complete decoupling, and 1, representing complete coupling. Note, however, that rather than being constant across the entire field, the coupling coefficient could be chosen to vary with pixel location. There are advantages to allowing the coupling coefficient to vary in this manner which will be discussed later.

Note that the boundary pixel locations have fewer pixels in their neighborhoods than do pixel locations within restoration field 10. In the described embodiment, the values of pixel locations outside of restoration field 10 are assumed to have zero values. Thus, for example, a corner pixel location such as location labelled "T", like the pixel at location "R", has four cliques represented in its surround field term, but two of the cliques contain pixels whose values are fixed to zero. Other acceptable approaches could have been used, such as reflecting the pixel values at the boundaries so that the pixel outside of the boundary has the same value as its mirror image on the inside of the boundary.

Using the total energy as defined above, a dynamical system is set up as specified by Eq. 6 in FIG. 3. This defines a set of equations of the form shown in Eq. 7, one equation for each of the pixel locations within restoration field 10. The dynamical system defined by these equations is then solved by using a gradient descent-based deterministic search to find the set of pixel values for restoration field 10 which yields a global energy minimum for the system. The set of pixel values which achieve the global minimum of the system energy represents an estimate of the restored image with the noise removed.

In the described embodiment, the set of equations representing the gradient of E over all of the dimensions of restoration field 10, i.e., over all pixels, is linearized and set equal to zero. The mathematics of this are shown in Eqs. 8–11 of FIG. 3b. Eq. 8 is an expression for $\partial E/\partial x^R_k$ derived from the sigmoid representations of the field and surround terms. Eq. 11 shows the resulting linearized equation for $\partial E/\partial x^R_k$. In this equation, $x^R_k$ is the only independent variable, $x^R_j$, $g_f$ and $g_s$ are assumed to remain constant during a single iteration, with values established by $X^M$ and the last set of values for $X^R$. The set of linearized equations for $\partial E/\partial x^R_k$ for all pixels provides the framework for iteratively solving for $X^R$ by using, for example, a fixed point iteration technique.

A search routine 100 for carrying out the deterministic search based upon the linearized set of equations is shown in FIG. 4. At the beginning of search routine 100, a set of variables that are used within the routine is initialized. The set of variables includes $\beta_{init}$ and $\beta_{final}$, which specify the range over which $\beta$ will be permitted to move, and $\lambda$ and $\Delta E$ (step 102). In the described embodiment $\beta$ and $\beta_{init}$ are set to 0.001, $\beta_{final}$ is set to 0.5 and $\lambda$ is set equal to 0.35 and $\Delta E$ is set equal to 100. Then, $X^R$ is set equal to $X^M$ (step 104) and $E_{old}$ is computed with the aid of Eqs. 3, 4 and 5 and using these initial values (step 106).

After the initialization has been performed, algorithm 100 solves the system of linearized equations for $\partial E/\partial x^R_k$ to find a new set of values for $\hat{X}^R$ (step 110). The above-described linearization assumptions make it possible to perform the computations for each pixel location independently of all other computations for other pixel locations. Thus, the computations of the new values for all of the $x^R_k$'s may be performed in a massively parallel fashion. During the first iteration, $X^R$ equals $X^M$; during later iterations, $X^R$ equals the set of values for $\hat{X}^R$, i.e., the $\hat{x}^R_k$'s, which were computed during the previous iteration. That is, the new values for $x^R_k$ are stored in a second buffer and at the end of the iteration (i.e., after values are computed for all pixels in restoration field 10) the entire array of new values in this buffer, namely, $\hat{X}^R$, becomes the set of values used for the next iteration.

Using these updated values for $X^R$, search routine 100 computes a new energy, $E_{new}$, of the system based on Eqs. 3, 4 and 5 (step 112). It then determines whether there was sufficient relative change in the total energy of the system since the last computation to justify further iterations at the current value of $\beta$ (step 114). That is, it determines whether the iterations are converging at a sufficiently fast rate. In particular, routine 100 computes the absolute value of $(E_{new}-E_{old})/E_{new}$, and compares the result to a threshold value $\epsilon$ (e.g., $\epsilon=0.01$). If the relative change in energy is greater than $\epsilon$, routine 100 sets $E_{old}$ equal to $E_{new}$ and moves onto the next iteration (step 116).

Search routine 100 continues through multiple iterations using a fixed value of $\beta$ until the relative change in the energy, i.e., the benefit of each successive iteration, falls below the threshold. At that point, routine 100 computes a new, larger value of $\beta$ at which to perform a next sequence of iterations. The selection of the next $\beta$ is based upon a global measure of the state of the system. In the described embodiment, the global measure is $\partial E/\partial \beta$, which indicates the sensitivity of the state of the system to changes in $\beta$. Thus, in step 118 routine 100 computes the value of $\partial E/\partial \beta$. The amount by which $\beta$ is to be changed for each successive set of iterations, i.e., $\Delta\beta$, is set so as to achieve a preselected change in energy, i.e., $\Delta E$. In step 120, routine 100 computes $\Delta\beta$ according to the following equation:

$$\Delta\beta = |\partial E/\partial \beta|^{-1}\Delta E,$$

and sets $\beta$ equal to $\beta+\Delta\beta$.

Before proceeding on to the next set of iterations, the new value of $\beta$ is compared to $\beta_{final}$ to determine whether it has risen beyond the permitted range of values for $\beta$ (step 122). If $\beta$ is no greater than $\beta_{final}$, routine 100 computes the energy of the system using $\beta$, sets $E_{old}$ equal to the computed value of the energy and branches back to step 110 to perform the fixed point iteration for the larger value of $\beta$ (step 124).

The above-described process continues until $\beta_{final}$ is reached, at which point routine 100 terminates and the resulting values for $X^R$ represent the restored image. During this process, the initial steps in gain (i.e., $\Delta\beta$) will tend to be small. And as the process homes in on the global minimum on the energy surface defined by E, the steps will become larger.

Appendix I presents programs written in C which generally perform the operations described above to reconstruct an image from a measured image.

The maximum value to which $\beta$ should be permitted to rise (i.e., $\beta_{final}$) depends upon the type of image being restored. For less defined images such as video images which have fuzzy detail and blurred boundaries, one need not cause $\beta$ to rise as far as for images in which there is sharp detail and well-defined boundaries.

As noted earlier, rather than using a constant $\lambda$ over the entire restoration field, it may be desirable to vary its value based upon prior knowledge about information within the image. A small $\lambda$ will tend to smooth the restored image, allowing the local variations in $X^M$ to spread through the entire $X^R$ during processing. In contrast, a large $\lambda$ will tend to force the restored image to more closely follow the measured image. This suggests that $\lambda$ can be varied across $X^M$ to represent prior knowledge about where an object is located. Thus, for example, if it is know that an object of interest is likely to be found within a particular area of $X^M$ (based possibly on other sensor information about the scene), it would be desirable to set the field coupling coefficient to a higher value in that area.

It has also been observed that $\lambda$ tends to characterize the sensor being used to generate $X^M$. Thus, the optimum $\lambda$ tends to be the same for all images generated by a given sensor type.

Although the value for $\Delta E$ specified above works well for a broad range of images and sensors, there is an empirical way to easily identify the optimum $\Delta E$ for any particular type of restoration problem. It involves repeated use of the above-described MRF restoration technique to restore an image from $X^M$, starting with a large value for $\Delta E$ and for each successive application of the restoration technique using successively smaller values of $\Delta E$. At the conclusion of each run, i.e., for each final restored image, the resulting value of E is computed. When one reaches the point at which further decreases in $\Delta E$ do not yield a meaningful improvement in E, the last value of $\Delta E$ to produce meaningful improvement is selected as the optimum value.

The use of a sigmoid saturation function (based on biological neural networks) in Eq. 5 allows sharp boundaries to be formed between dissimilar regions. Initially, with a small value of the gain ($\beta=0.001$), the segmentation between regions is blurred. As the gain is increased during the restoration process a sharp segmentation results. The main advantage of using a sigmoid surround term is that sharp segmentations can be obtained without the use of a separate "line process". The neural network based sigmoid function solves the problem of providing smoothing (noise reduction) while preserving naturally occurring boundary information in the scene.

The above-described MRF model was applied to a synthetic range image corrupted with noise according to a range sensor measurement model described in the literature (see, M. B. Mark, "Multipixel, Multidimensional Laser Radar System Performance," PhD Thesis, Dept. of Electrical Engineering and Computer Science, MIT, 1986). This model simulates a peak detecting laser radar sensor that introduces anomalies into the measurement. It is used to corrupt an image by relating the Carrier-to-Noise Ratio (CNR) of the range sensor to the expected percent anomalies in the measurement. An anomaly is defined as a pixel value in the corrupted image differing from the value in the original image by more than two pixel counts. In this work CNR values of 10 dB and 6 dB were used; which corresponds to 20% and 71% anomalies in the corrupted image. The measurement model does not assume a Gaussian distribution and is based on realistic sensor measurements.

The original (noise free) synthetic image shown in FIG. 7 has a simple shape at a constant pixel value with a background that linearly increases in pixel value from the top to the bottom of the image. In this work all the input and restored images have 8-bits (256 gray levels) of resolution. FIG. 8 shows a simulated range image corrupted with 20% anomalies and FIG. 9 shows the result of the MRF restoration. Except for a few discrepancies at the boundary the restoration is nearly perfect, especially the recovery of the sloping background. FIG. 10 shows a high noise simulated range image with 71% anomalies and FIG. 11 shows the result of MRF restoration. At this noise level the original shape is barely recognizable by the human visual system, yet the underlying edges that define the object shape have been recovered in the restoration as shown in FIG. 11. In both cases the MRF model produces a piecewise smooth restoration of the input images. The use of the sigmoid pair potential has solved the problem of reducing noise (smoothing) while preserving sharp discontinuities (edges).

A quantitative analysis of the model performance was based on the average percent anomalous pixels in the restored image. This measure is relevant to object detection in a noisy environment. FIG. 12 shows a statistical comparison between corrupted images with and without restoration. Each point on the graph is an average over 10 runs at a fixed noise level. The average percent anomalies in the image gives an indication of the difficulty of object detection, i.e., the probability of detection is lower at high anomaly rates. The base case is the simulated range measurement at a given CNR with no processing done to restore the image. The results show that the restoration is effective up to about CNR=6 dB (71 average percent anomalies). At this CNR the median filtered image has an average anomaly rate of 55%, while the MRF restored image has a rate of only 4.5%. Clearly the MRF restoration provides superior detection performance in a high noise environment.

The entire self annealing deterministic search can be implemented on a VLSI chip using the components shown in FIGS. 5 and 6.

FIG. 5 is an integrated circuit 200 which implements the sigmoid function. Pixel values are supplied to the terminals labelled "A" and "B" as voltages. The gain (i.e., $\beta$) is controlled by the voltage on the terminal labelled "GAIN". Circuit 200 is made of NMOS transistors which have their substrates tied to $V_{ss}=-5$ volts. The dimensions and modes of operation for the NMOS transistors are as listed in the following table:

| Transistor | Dimensions | Mode |
|---|---|---|
| M1 = M2 | 25/6 | NAT |
| M3 = M4 | 25/6 | ENH |
| M5 | 10/6 | DEP |
| M6 | 20/6 | ENH |
| M7 | 10/10 | DEP |
| M8 | 10/6 | NAT |
| M9 | 18/6 | NAT |

Dimensions are presented as Width/Length with units of microns. The mode abbreviations are as follows: NAT means native mode; ENH means enhancement mode; and DEP means depletion mode. The capacitors, $C_A$ and $C_B$, are 30 pf, 15μ×15μ double poly capacitors.

FIG. 6 shows the manner in which multiple circuits 200 are connected to form a circuit component 300 which models the field and surround couplings for one pixel location of the $X^R$ and $X^M$ images. The voltages at the nodes labelled "R", "S" and "M" in FIG. 6 correspond to the pixel values at the nodes of the same labels in FIG. 1. The circuit can be extended to include other pixel locations of the image in the manner suggested by the dotted lines in FIG. 6. Once all pixel locations are fully accounted for by properly connected circuit components 300, the entire circuit models the field and surround terms for the entire measurement $X^M$ and restoration field $X^R$.

After a circuit which models the entire measurement and restoration field is constructed, it can be used to automatically solve for the restored image in the following way. With the gain set at the desired initial value, the voltages corresponding to the pixel values of $X^M$ may be clocked into the corresponding capacitors $C_A$, representing the measurement plane, and $C_B$, representing the restoration plane, and the circuit allowed to relax toward steady state. The gain may then be readjusted upward, based for example on a global measure of the state of the system, and the circuit again allowed to relax using the updated gain value. This cycle is repeated for successively larger values of gain until the values of $X^R$, that is, the voltages at the "B" terminals, no longer change significantly in response to increases in gain. The final set of voltages on the "B" terminals represent the restored image.

FIG. 13 is a schematic diagram of an image restoration system in accordance with the invention. As illustrated, the system 400 uses a sensor 410 to measure a view 415 of an object 420. The sensor 410 generates data values for each pixel of the measured view 415. These measured data values are stored in a first memory array 432 of memory 430. A processor 440 transforms the measured data values from the measured memory array 432 into data values for a restored image stored in a second memory array 438 in the memory 430. The processor 440 can use a buffer 435 in memory 430 for temporarily storing the results of calculations. A restored image view 450 can be reproduced by the processor 440.

Other embodiments are within the following claims. For example, though in the above-described embodiment measurement field 12 and restoration field 10 included only a single plane of pixel data each, there is no reason why each of these fields could not be represented by multiple planes of pixel data. It may be desirable to develop such a model if data from multiple sensors is available for a given scene. In that event, there could be multiple field coupling terms, each term accounting for the coupling between a pixel in a restoration image plane and the corresponding pixel in different one of the measurement planes. In addition, the surround term for a given pixel in a given restoration plane could account for coupling to neighboring pixels in other restoration planes as well as, or even instead of, couplings to neighboring pixels in the same restoration plane.

Tue Mar 26 13:01:49 1991 samp            APPENDIX I            Printed Tue Mar 26 13:08:52 1991 Page 1

```
/*
This is a sample program that demonstrates use of the image restoration
functions based on nonlinear MRF's. It can also genaerate a movie of
the entire restoration where each iteration is stored in a frame.
*/ main()
{
    int        stat;

/*
    rows, cols     - # of row and columns
    meas_image     - contains the mesured image from the sensor
    proc_image     - restored image
    field_coupling - array contains field coupling values
    maximum field gain - max_beta_f
    maximum surround  gain - max_beta_s
    final_energy   - final system energy
    num_iter       - number of iterations required for the restoration
    err_tol        - error tolerance for the restoration
    fptr           - file pointer for a movie file
    movie_file     - movie file name
    num_bits       - number of bits resolution for movie images
    format         - movie file format
    type           - movie image type
    movie_flag     - flag to indicate whether to generate a movie
*/ stat = setup_mrf_storage_new(row, cols);

stat = mrf_cross(meas_image, proc_image, field_coupling, rows, cols,
            max_beta_f, max_beta_s, &final_energy,
            &num_iter, err_tol, fptr, movie_file,
            num_bits, format, type, movie_flg);

stat = deallocate_mrf_storage_new();

exit(0);
}
```

APP-1

```
/*
  This routine does image restoration using sigmoid potentials for both the
  measurement and surround terms. The measured image [meas_image] and the
  processed image [proc_image] are both assumed to be of type [float]. The images
  are assumed to be stored in RASTER format. The
  array [field_coupling] determines the contribution of the measurement term
  relative to the surround term. The processed image is initially set to the
  measured image, and the final result is returned in [proc_image]. This
  routine uses a deterministic formulation, and solves the system using a
  vectorized fixed point iteration. The final system energy and
  the total number of iterations is returned. These routines are to be called
  from C programs.
*/ include <stdio.h>
include <math.h> include <local/std_file.h>
include <local/universal.h>
include <local/array.h> include "new_filter.h"

int mrf_cross(meas_image, proc_image, field_coupling, rows, cols, min_beta_f, min_beta_s,
              energy, iter, error_tol, wptr, ot_file, bits, frm, typ, wflg)
    float          *meas_image;
    float          *proc_image;
    int            rows, cols;
    float          min_beta_f, min_beta_s;
    float          *field_coupling;
    float          *energy;
    int            *iter;
    float          error_tol;
    struct uff_file_block *wptr;
    char           ot_file[];
    int            bits, frm, typ, wflg;
{
    int            beta_iter, i, j, num_iter, stat;
    float          energy_old, energy_new;
    float          beta_f, beta_s;
    float          dbeta_f, dbeta_s;
    float          derivative_f, derivative_s;
    float          energy_diff_abs, energy_diff_rel;
    float          *the_fc;
    float          total_energy_cross();
    float          evaluate_derivative_cross_ms();
    float          evaluate_derivative_cross_sur();

if (meas_image != NULL && proc_image != NULL) {
       the_fc = field_coupling;

find_data_range(meas_image, rows, cols, &scale_to_data);

beta_f = START_BETA;
       beta_s = START_BETA;
#if 0
       printf("Scale-to-data = %-f\n", scale_to_data);
endif current_value_beta_f = beta_f;
       current_value_beta_s = beta_s;

solver_cross(meas_image, proc_image, the_fc, beta_f, beta_s);
```

APP-2

```
Mon Mar 25 11:05:51 1991  mrf_c.                              Printed Tue Mar 26 12:36:04 1991  Page   2 if (wflg > 0) {
        if (bits > 8)
                stat = write_proc_image16(wptr, proc_image, ot_file, frm, typ, 1);
        else
                stat = write_proc_image8(wptr, proc_image, ot_file, frm, typ, 1);
        } energy_old = total_energy_cross(the_fc);

num_iter = 1;

beta_iter = 1;

do {
          for(j=0; j<MAX_MRF_ITER; j++) { solver_cross(meas_image, proc_image, the_fc, beta_f, beta_s);

if (wflg > 0) {
           if (bits > 8)
                   stat = write_proc_image16(wptr, proc_image, ot_file, frm, typ, 0)»
»;
           else
                   stat = write_proc_image8(wptr, proc_image, ot_file, frm, typ, 0);»
»
           } energy_new = total_energy_cross(the_fc);

/      energy_diff_abs = fabs(energy_new - energy_old);

energy_diff_rel =
           (energy_new <= 0.0) ? energy_diff_abs : (energy_diff_abs / energy_new);

num_iter ++;

if (energy_diff_rel <= error_tol) break;

energy_old = energy_new;
          }
           derivative_f =
        evaluate_derivative_cross_ms(meas_image, proc_image, the_fc, beta_f);

derivative_f  = fabs(derivative_f);

dbeta_f = (derivative_f <= 0.0) ? min_beta_f : (DELTA_E / derivative_f);

beta_f -= dbeta_f;
           beta_f = (beta_f > min_beta_f) ? beta_f : min_beta_f;

derivative_s = evaluate_derivative_cross_sur(proc_image, beta_s);

derivative_s  = fabs(derivative_s);

dbeta_s = (derivative_s <= 0.0) ? min_beta_s : (DELTA_E / derivative_s);

beta_s -= dbeta_s;
           beta_s = (beta_s > min_beta_s) ? beta_s : min_beta_s;
#if 0
        fprintf(stderr, "Energy = %f\n", energy_new);
           fprintf(stderr, "Energy diff = %f, Beta = %f\n", energy_diff_abs, beta);
#endif
           beta_iter ++;
```

```
       } while ((beta_f > min_beta_f || beta_s > min_beta_s) && beta_iter < MAX_IT»
»ER_BETA);

current_value_beta_f = beta_f;
    current_value_beta_s = beta_s;

*energy = energy_new;

*iter = num_iter;

return(1);
  }
  else
    return(-1);
}
```

APP-4

```
Mon Mar 25 11:03:56 1991  solve    ss.c                                    Printed Tue Mar 26 12:36:05 1991 Page  1 include <stdio.h>
include <math.h> include <local/array.h> include "new_filter.h"

int solver_cross(the_image, the_lattice, fld_cp, beta_f, beta_s)
float           *the_lattice, *the_image;
float           *fld_cp, beta_f, beta_s;
{
    int         nsz, stat;
    int         k_inner, k_limit, k_outer;
    float       *loc_lattice, *loc_tmp;

nsz = cur_size;

loc_tmp = tmp_buf;
    loc_lattice = the_lattice;

/* $dir no_recurrence */
    for(k_inner=0; k_inner<nsz; k_inner++)
        loc_tmp[k_inner] = loc_lattice[k_inner];

stat = update_surround(beta_s);
    if (stat < 0) return(stat);

stat = update_lattice(the_image, the_lattice, fld_cp, beta_f);
    if (stat < 0) return(stat);

return(1);
}
```

APP-5

```c
#include <stdio.h>
include <math.h> include <local/array.h> include "new_filter.h"

int update_surround(beta)
float       beta;
{
    int     idxa, idxb, i, nclq;
    int     k_inner, k_limit, k_outer;
    float   den_sur, diff_sur, exp_sur, g_sur, loc_beta, scl_dat, sq_diff_sur;

int    **loc_clq;
    float  *loc_energy_sur;
    float  *loc_der_sur;
    float  *loc_img;
    float  *loc_pot;
    float  *loc_gval;

loc_clq  = clique_map->storage;
    loc_energy_sur = energy_surround;
    loc_img = tmp_buf;
    loc_pot = clique_potential;
    loc_gval = clique_gvalue;
    scl_dat = scale_to_data;
    loc_beta = beta;

nclq = num_cliques;

/* $dir no_recurrence */
    for(k_inner=0; k_inner<nclq; k_inner++) {
       idxa = loc_clq[0][k_inner];
       idxb = loc_clq[1][k_inner];

diff_sur = (loc_img[idxa] - loc_img[idxb]) * scl_dat;
       sq_diff_sur = loc_beta * diff_sur * diff_sur;
       loc_pot[k_inner] = (sq_diff_sur < EXPONENT_LIMIT) ? 0.0 : exp(sq_diff_sur);
       exp_sur = loc_pot[k_inner];
       den_sur = 1.0 + exp_sur;
       g_sur = exp_sur / (den_sur * den_sur);

loc_gval[k_inner] = g_sur;
       loc_energy_sur[k_inner] = 1.0 / den_sur;
    } return(1);
}
```

```c
#include <stdio.h>
include <math.h> include <local/array.h> include "new_filter.h"

int update_lattice(the_image, the_lattice, fld_cp, beta)
float           *the_lattice, *the_image, *fld_cp;
float           beta;
{
    int    idxn, idxs, idxe, idxw, nsz;
    int    k_inner, k_limit, k_outer;
    int    idx_cn, idx_cs, idx_ce, idx_cw;
    float  diff_meas, measured_pixel, sq_diff_meas, state, rhs, denom, exponent;
    float  den_m, en_m, g_meas, g_north, g_south, g_east, g_west;

int    **loc_mrf_map;
    int    **loc_mrf_cl;
    float  *lattice;
    float  *loc_energy_ms;
    float  *loc_der_ms;
    float  *image;
    float  *loc_img;
    float  *local_field_coupling;
    float  *loc_pot;
    float  *loc_gval;
    float  scl_dat;
    float  loc_beta;

loc_mrf_map = mrf_map->storage;
    loc_mrf_cl = mrf_to_clique->storage;
    lattice = the_lattice;
    loc_energy_ms = energy_measured;
    loc_der_ms = the_derivative_ms;
    image = the_image;
    loc_img = tmp_buf;
    local_field_coupling = fld_cp;
    loc_pot = clique_potential;
    loc_gval = clique_gvalue;
    scl_dat = scale_to_data;
    loc_beta = beta;

nsz = cur_size;

/* $dir no_recurrence */
    for(k_inner=0; k_inner<nsz; k_inner++) {
        idx_cn = loc_mrf_cl[0][k_inner];
        idx_cs = loc_mrf_cl[1][k_inner];
        idx_cw = loc_mrf_cl[2][k_inner];
        idx_ce = loc_mrf_cl[3][k_inner];
        idxn = loc_mrf_map[0][k_inner];
        idxs = loc_mrf_map[1][k_inner];
        idxw = loc_mrf_map[2][k_inner];
        idxe = loc_mrf_map[3][k_inner];

measured_pixel = image[k_inner];

state = loc_img[k_inner];

diff_meas = (state - measured_pixel) * scl_dat;

sq_diff_meas = loc_beta * diff_meas * diff_meas;

/* Calculate measured component */
        exponent = (sq_diff_meas < EXPONENT_LIMIT) ? 0.0 : exp(sq_diff_meas);
```

```
            den_m = 1.0 + exponent;
            g_meas = exponent / (den_m * den_m);

loc_energy_ms[k_inner] = 1.0 / den_m;

/* Calculate north surround component */
            g_north = loc_gval[idx_cn];

/* Calculate south surround component */
            g_south = loc_gval[idx_cs];

/* Calculate east surround component */
            g_east = loc_gval[idx_ce];

/* Calculate west surround component */
            g_west = loc_gval[idx_cw];

rhs = - 4.0 * local_field_coupling[k_inner] * g_meas * measured_pixel;

denom = - 4.0 * local_field_coupling[k_inner] * g_meas - g_north - g_south
                    - g_east - g_west;
            denom = (fabs(denom) > ERR_LIM) ? denom : ERR_LIM;

lattice[k_inner] = (rhs - g_south *
                    loc_img[idxs] - g_north *
                    loc_img[idxn] - g_east *
                    loc_img[idxe] - g_west *
                    loc_img[idxw]) / denom;
        } return(1);
    }
```

```
Fri Mar 22 08:27:34 1991  tota...gy.c                          Printed Tue Mar 26 12:36:05 1991  Page  1 include <stdio.h>
include <math.h> include <local/array.h> include "new_filter.h"

float total_energy_cross(fld_cp)
float           *fld_cp;
{ int         i, nclq, nsz;
    float       energy_min, energy_ms, energy_sur, energy_tot;
    float       *loc_ems, *loc_esur;

nsz = cur_size;
    nclq = num_cliques;
    loc_esur = energy_surround;
    loc_ems = energy_measured;

energy_min = 0.0;
    energy_sur = 0.0;
    energy_ms = 0.0;

for(i=0; i<nsz; i++) {
        energy_min += fld_cp[i];
        energy_ms += fld_cp[i] * loc_ems[i];
    } energy_min = 0.5 * 4.0 * energy_min + 0.5 * nclq;

for(i=0; i<nclq; i++)
        energy_sur += loc_esur[i];

energy_tot = (4.0 * energy_ms + energy_sur - energy_min) / energy_min;

return(energy_tot);
}
```

APP-9

```c
Thu Mar 21 14:41:40 1991  update_que.c                                    Printed Tue Mar 26 12:36:06 1991  Page  1 include <stdio.h>
include <math.h> include <local/array.h> include "new_filter.h"

int update_clique_potential(beta)
float                    beta;
{
    int     i, nclq;
    int     idxa, idxb;
    float   diff, scl_dat, sq_diff;
    float   *loc_pot, *loc_tmp;
    int     **loc_clq;

loc_clq = clique_map->storage;
    loc_pot = clique_potential;
    loc_tmp = tmp_buf;
    scl_dat = scale_to_data;
    nclq = num_cliques;

/* $dir no_recurrence */
    for(i=0; i<nclq; i++) {
        idxa = loc_clq[0][i];
        idxb = loc_clq[1][i];

diff = (loc_tmp[idxa] - loc_tmp[idxb]) * scl_dat;
        sq_diff = diff * diff * beta;
        loc_pot[i] = (sq_diff < EXPONENT_LIMIT) ? 0.0 : exp(sq_diff);
    } return(1);
}
```

Fri Mar 22 09:30:36 1991  updat    .c                                    Printed Tue Mar 26 12:36:06 1991  Page  1

```
#include <stdio.h>
include <math.h> include <local/array.h> include "new_filter.h"

int update_derivative_ms(the_image, the_lattice, beta)
float           *the_image, *the_lattice;
float           beta;
{
   int          k, nsz;
   float        loc_beta, scl_dat;

float den_m, diff_meas, en_m, exponent, g_meas;
   float measured_pixel, sq_diff_meas, state;
   float *loc_der_ms;
   float *loc_img;
   float *image;
   float *loc_pot;
   float *loc_gval;

loc_der_ms = the_derivative_ms;
   loc_img = the_lattice;
   image = the_image;
   loc_pot = clique_potential;
   loc_gval = clique_gvalue;
   scl_dat = scale_to_data;
   loc_beta = beta;

nsz = cur_size;

/* $dir no_recurrence */
   for(k=0; k<nsz; k++) {
      measured_pixel = image[k];

state = loc_img[k];

diff_meas = (state - measured_pixel) * scl_dat;

sq_diff_meas = loc_beta * diff_meas * diff_meas;

/* Calculate measured component */
      exponent = (sq_diff_meas < EXPONENT_LIMIT) ? 0.0 : exp(sq_diff_meas);
      den_m = 1.0 + exponent;
      g_meas = exponent / (den_m * den_m);

loc_der_ms[k] = (g_meas * sq_diff_meas) / loc_beta;
   } return(1);
} int update_derivative_sur(the_lattice, beta)
float           *the_lattice;
float           beta;
{
   int          idxa, idxb, k, nclq;
   float        den_sur, diff_sur, loc_beta, scl_dat, sq_diff_sur;

int   **loc_clq;
   float *loc_der_sur;
   float *loc_img;
   float *loc_pot;
   float *loc_gval;
```

```
Fri Mar 22 09:30:36 1991  update        .c                                    Printed Tue Mar 26 12:36:06 1991  Page   2 loc_clq   = clique_map->storage;
     loc_der_sur = the_derivative_sur;
     loc_img   = the_lattice;
     loc_pot   = clique_potential;
     loc_gval  = clique_gvalue;
     scl_dat   = scale_to_data;
     loc_beta  = beta;

nclq = num_cliques;

/* $dir no_recurrence */
     for(k=0; k<nclq; k++) {
         idxa = loc_clq[0][k];
         idxb = loc_clq[1][k];

diff_sur = (loc_img[idxa] - loc_img[idxb]) * scl_dat;
         sq_diff_sur = loc_beta * diff_sur * diff_sur;

loc_der_sur[k] = (loc_gval[k] * sq_diff_sur) / loc_beta;
     } return(1);
}
```

APP-12

```c
/*
   There is a mapping for the MRF and one for the cliques.  The MRF mapping is used
   to update the pixel values, while the clique mapping is used to calculate the
   system energy.
*/ include <stdio.h> include <local/array.h> include "new_filter.h"

int             index_vec[9];
float           sort_val[9];

float           current_value_beta_f = 0.0;
float           current_value_beta_s = 0.0;
float           scale_to_nsz = 0.0;
float           scale_to_data = 1.0;
float           scale_energy = 0.0;
int             cur_size = -1, init_flg = 1, num_cliques = -1;
int             cur_rows = -1, cur_cols = -1;
float           *the_sum = NULL;
float           *energy_measured = NULL;
float           *energy_surround = NULL;
float           *the_derivative_ms = NULL;
float           *the_derivative_sur = NULL;
float           *clique_potential = NULL;
float           *clique_gvalue = NULL;
float           *tmp_buf = NULL;
int_array_2d    *clique_map = NULL;
int_array_2d    *mrf_map = NULL;
int_array_2d    *mrf_to_clique = NULL;

int setup_mrf_storage_new(rw, cl)
int                rw, cl;
{
    int       cnt, i, j, k, nsz;

nsz = rw * cl;

if (nsz < 0) return(-1);

if (init_flg == 1 || cur_size != nsz) {
        cur_rows = rw;
        cur_cols = cl;

/*--- Setup the indexing for the median filter -------------------------------*/
/*****************************************************************************/
        if (the_sum != NULL) free((char *) the_sum);
        the_sum = (float *) malloc(nsz * sizeof(float));
        if (the_sum == NULL) return(-2);

index_vec[0] = 0;
        index_vec[1] = cl + 2;
        index_vec[2] = - (cl + 2);
        index_vec[3] = 1;
        index_vec[4] = -1;
        index_vec[5] = cl + 2 + 1;
        index_vec[6] = cl + 2 - 1;
        index_vec[7] = 1 - (cl + 2);
        index_vec[8] = - 1 - (cl + 2);
/*****************************************************************************/
```

```
/*--- Allocate the index storage for the clique and MRF mappings  ------------*/
/***********************************************************************/ if (tmp_buf != NULL) free((char *) tmp_buf);
        tmp_buf = (float *) malloc(nsz * sizeof(float));
        if (tmp_buf == NULL) return(-2);

num_cliques = 2 * nsz - rw - cl;

if (clique_map != NULL) free_array_2d(clique_map);
        clique_map = ALLOCATE_ARRAY_2D(NUM_NODES_CLIQUE, num_cliques, int_array_2d);
        if (clique_map == NULL) return(-2);

if (mrf_map != NULL) free_array_2d(mrf_map);
        mrf_map = ALLOCATE_ARRAY_2D(NUM_SURROUND, nsz, int_array_2d);
        if (mrf_map == NULL) return(-2);

if (mrf_to_clique != NULL) free_array_2d(mrf_to_clique);
        mrf_to_clique = ALLOCATE_ARRAY_2D(NUM_SURROUND, nsz, int_array_2d);
        if (mrf_to_clique == NULL) return(-2);
/***********************************************************************/

/*--- Allocate various buffers  ---------------------------------------*/
/***********************************************************************/ if (energy_measured != NULL) free((char *) energy_measured);
        energy_measured = (float *) malloc(nsz * sizeof(float));
        if (energy_measured == NULL) return(-2);

if (energy_surround != NULL) free((char *) energy_surround);
        energy_surround = (float *) malloc(num_cliques * sizeof(float));
        if (energy_surround == NULL) return(-2);

if (the_derivative_ms != NULL) free((char *) the_derivative_ms);
        the_derivative_ms = (float *) malloc(nsz * sizeof(float));
        if (the_derivative_ms == NULL) return(-2);

if (the_derivative_sur != NULL) free((char *) the_derivative_sur);
        the_derivative_sur = (float *) malloc(num_cliques * sizeof(float));
        if (the_derivative_sur == NULL) return(-2);

if (clique_potential != NULL) free((char *) clique_potential);
        clique_potential = (float *) malloc(num_cliques * sizeof(float));
        if (clique_potential == NULL) return(-2);

if (clique_gvalue != NULL) free((char *) clique_gvalue);
        clique_gvalue = (float *) malloc(num_cliques * sizeof(float));
        if (clique_gvalue == NULL) return(-2);
/***********************************************************************/

/*--- Setup the clique indexing  --------------------------------------*/
/***********************************************************************/ cnt = 0;

for(i=0; i<rw; i++)    /* Setup all the horizontal cliques */
           for(j=0; j<cl-1; j++) {
           k = i * cl + j;
```

```
            clique_map->storage[0][cnt] = k;
            clique_map->storage[1][cnt] = k + 1;

mrf_to_clique->storage[3][k] = cnt;
        mrf_to_clique->storage[2][k + 1] = cnt;

if (j == 0)
            mrf_to_clique->storage[2][k] = cnt;

if (j == (cl-2))
            mrf_to_clique->storage[3][k + 1] = cnt;

cnt ++;
     } for(j=0; j<cl; j++)    /* Setup all the vertical cliques */
     for(i=0; i<rw-1; i++) {
        k = i * cl + j;
            clique_map->storage[0][cnt] = k;
            clique_map->storage[1][cnt] = k + cl;

mrf_to_clique->storage[1][k] = cnt;
        mrf_to_clique->storage[0][k + cl] = cnt;

if (i == 0)
            mrf_to_clique->storage[0][k] = cnt;

if (i == (rw-2))
            mrf_to_clique->storage[1][k + cl] = cnt;

cnt ++;
     }
/**********************************************************************/

/*--- Setup the MRF indexing ----------------------------------------*/

/**********************************************************************/ for(i=1; i<rw-1; i++) /* Setup the pixel mappings in the middle region */
     for(j=1; j<cl-1; j++) {
        k = i * cl + j;
        mrf_map->storage[0][k] = k - cl;
        mrf_map->storage[1][k] = k + cl;
        mrf_map->storage[2][k] = k - 1;
        mrf_map->storage[3][k] = k + 1;
     } i = 0;         /* Top left corner */
     j = 0;
     k = i * cl + j;

mrf_map->storage[0][k] = k + cl;
     mrf_map->storage[1][k] = k + cl;
     mrf_map->storage[2][k] = k + 1;
     mrf_map->storage[3][k] = k + 1;

i = 0;         /* Top right corner */
     j = cl - 1;
     k = i * cl + j;

mrf_map->storage[0][k] = k + cl;
     mrf_map->storage[1][k] = k + cl;
     mrf_map->storage[2][k] = k - 1;
     mrf_map->storage[3][k] = k - 1;
```

```
        cnt ++;

i = rw - 1;    /* Bottom left corner */
        j = 0;
        k = i * cl + j;

mrf_map->storage[0][k] = k - cl;
        mrf_map->storage[1][k] = k - cl;
        mrf_map->storage[2][k] = k + 1;
        mrf_map->storage[3][k] = k + 1;

i = rw - 1;    /* Bottom right corner */
        j = cl - 1;
        k = i * cl + j;

mrf_map->storage[0][k] = k - cl;
        mrf_map->storage[1][k] = k - cl;
        mrf_map->storage[2][k] = k - 1;
        mrf_map->storage[3][k] = k - 1;

i = 0;         /* Top line */ for(j=1; j<cl-1; j++) {
            k = i * cl + j;

mrf_map->storage[0][k] = k + cl;
        mrf_map->storage[1][k] = k + cl;
        mrf_map->storage[2][k] = k - 1;
        mrf_map->storage[3][k] = k + 1;
        } i = rw - 1;    /* Bottom line */ for(j=1; j<cl-1; j++) {
            k = i * cl + j;

mrf_map->storage[0][k] = k - cl;
        mrf_map->storage[1][k] = k - cl;
        mrf_map->storage[2][k] = k - 1;
        mrf_map->storage[3][k] = k + 1;
        } j = 0;             /* Left line */ for(i=1; i<rw-1; i++) {
            k = i * cl + j;

mrf_map->storage[0][k] = k - cl;
        mrf_map->storage[1][k] = k + cl;
        mrf_map->storage[2][k] = k + 1;
        mrf_map->storage[3][k] = k + 1;
        } j = cl - 1;    /* Right line */ for(i=1; i<rw-1; i++) {
            k = i * cl + j;

mrf_map->storage[0][k] = k - cl;
        mrf_map->storage[1][k] = k + cl;
        mrf_map->storage[2][k] = k - 1;
        mrf_map->storage[3][k] = k - 1;
        }
/**********************************************************************/
}
```

```
        init_flg = 0;
        scale_to_nsz = 1.0 / (float) nsz;
        cur_size = nsz;
    } return(1);
}
```

```
#include <stdio.h>
include <math.h> include <local/array.h> include "new_filter.h"

int find_data_range(the_lattice, rows, cols, scale)
float           *the_lattice;
int             rows, cols;
float           *scale;
{
    int    i, idxa, idxb, j, nsz;
    float  diff, scl, vmn, vmx;
    int    **ca;

if (the_lattice != NULL) {
       nsz = rows * cols;

vmn = 9.9e20;
       vmx = -9.9e20;

ca = clique_map->storage;

for(i=0; i<nsz; i++) {
       idxa = ca[0][i];
       idxb = ca[1][i];

diff = fabs(the_lattice[idxa] - the_lattice[idxb]);

vmn = (diff < vmn) ? diff : vmn;
       vmx = (diff > vmx) ? diff : vmx;
        } scl = vmx - vmn;
        if (scl <= 0.0)
       *scale = 1.0;
        else
       *scale = 1.0 / scl;

return(1);
    }
    else
       return(-1);
}
```

```
#include <stdio.h>
include <math.h> include <local/array.h> include "new_filter.h"

float evaluate_derivative_cross_ms(the_image, the_lattice, fld_cp, beta)
float                      *the_image, *the_lattice, *fld_cp;
float                      beta;
{
    int         i, nsz, stat;
    float       der_ms, tot_derivative;
    float       *loc_der_ms = the_derivative_ms;
    float       *loc_fld_cp = fld_cp;

nsz = cur_size;

stat = update_derivative_ms(the_image, the_lattice, beta);

der_ms = 0.0;

for(i=0; i<nsz; i++)
        der_ms -= loc_fld_cp[i] * loc_der_ms[i];

tot_derivative = scale_to_nsz * der_ms;

return(tot_derivative);
} float evaluate_derivative_cross_sur(the_lattice, beta)
float                      *the_lattice;
float                      beta;
{
    int         i, nclq, stat;
    float       der_ms, der_sur, tot_derivative;
    float       *loc_der_sur = the_derivative_sur;

nclq = num_cliques;

stat = update_derivative_sur(the_lattice, beta);

der_sur = 0.0;

for(i=0; i<nclq; i++)
        der_sur -= loc_der_sur[i];

tot_derivative = der_sur / (float) nclq;

return(tot_derivative);
}
```

```
/*
  There is a mapping for the MRF and one for the cliques.  The MRF mapping is used
  to update the pixel values, while the clique mapping is used to calculate the
  system energy.
*/ include <stdio.h> include <local/array.h> include "new_filter.h"

int deallocate_mrf_storage_new()
{
    int     cnt, i, j, k, nsz;

if (init_flg == 0) {
       cur_rows = -1;
       cur_cols = -1;
       cur_size = -1;
       init_flg = 1;
       num_cliques = -1;

if (the_sum != NULL) free((char *) the_sum);
       the_sum == NULL;

if (energy_measured != NULL) free((char *) energy_measured);
       energy_measured == NULL;

if (energy_surround != NULL) free((char *) energy_surround);
       energy_surround == NULL;

if (the_derivative_ms != NULL) free((char *) the_derivative_ms);
       the_derivative_ms == NULL;

if (the_derivative_sur != NULL) free((char *) the_derivative_sur);
       the_derivative_sur == NULL;

if (clique_potential != NULL) free((char *) clique_potential);
       clique_potential = NULL;

if (clique_gvalue != NULL) free((char *) clique_gvalue);
       clique_gvalue = NULL;

if (tmp_buf != NULL) free((char *) tmp_buf);
       tmp_buf = NULL;

if (clique_map != NULL) free_array_2d(clique_map);
       clique_map = NULL;

if (mrf_map != NULL) free_array_2d(mrf_map);
       mrf_map = NULL;

if (mrf_to_clique != NULL) free_array_2d(mrf_to_clique);
       mrf_to_clique = NULL;

current_value_beta_f = 0.0;
       current_value_beta_s = 0.0;
       scale_to_nsz = 0.0;
       scale_to_data = 1.0;
       scale_energy = 0.0;
    } return(1);
}
```

```c
#include <stdio.h>
include <math.h> include <local/std_file.h>
include <local/universal.h> int write_proc_image8(inp_img_ptr, out_img, ot_file, format, type, write_flag)
struct uff_file_block   *inp_img_ptr;
float                   *out_img;
char                    ot_file[];
int                     format, type, write_flag;
{
    int                 i, nsz, pat_num, stat, min_val, rows, cols;
    float               scale, vmn, vmx;
    unsigned char       *buf8;
    struct uff_file_block *optr;

if (out_img != NULL && inp_img_ptr != NULL) {
        optr = (struct uff_file_block *) malloc(sizeof(struct uff_file_block));

clear_uff(optr);

rows = inp_img_ptr->size_dim[0];
        cols = inp_img_ptr->size_dim[1];

nsz = inp_img_ptr->pat_size;

for(i=0; i<8; i++)
            optr->pat_class_name[i] = inp_img_ptr->pat_class_name[i];

optr->pat_class_name[8] = '\0';

switch(format) {
          case 0:
        if (inp_img_ptr->file_format == 0) {
                for(i=0; i<80; i++)
                    optr->std_file_hdr[i] = inp_img_ptr->std_file_hdr[i];
            optr->std_file_hdr[79] = '\0';
        }
        else {
                for(i=0; i<80; i++)
                    optr->std_file_hdr[i] = inp_img_ptr->nato_pat_hdr[i];
            optr->std_file_hdr[79] = '\0';
        } init_image(optr, rows, cols, 8, 0, 0); /* Set up 8-bit STD output */ buf8 = (unsigned char *) malloc(nsz * sizeof(char));

/* $dir no_recurrence */
        for(i=0; i<nsz; i++)
          buf8[i] = (unsigned char) out_img[i];

optr->write_mode = write_flag;

stat = open_wrt_pattern(optr, ot_file);
        if (stat < 0) {
           fprintf(stderr, "Error opening file for write: %d\n", stat);
           free((char *) buf8);
           free((char *) optr);
           return(-2);
        } stat = write_buf8(optr, buf8);
        if (stat < 0) {
```

```
    fprintf(stderr, "Error writing file: %d\n", stat);
    free((char *) buf8);
    free((char *) optr);
    return(-2);
} stat = close_sng_pattern(optr);
if (stat < 0)
   fprintf(stderr, "Error closing file: %d\n", stat);

free((char *) buf8);

break;

case 1:
clear_uff(optr);

init_image(optr, rows, cols, 8, 1, 0); /* Set up 8-bit NATO output */ buf8 = (unsigned char *) malloc(nsz * sizeof(char));

/* $dir no_recurrence */
for(i=0; i<nsz; i++)
   buf8[i] = (unsigned char) out_img[i];

optr->write_mode  = write_flag;

stat = open_wrt_pattern(optr, ot_file);
if (stat < 0) {
   fprintf(stderr, "Error opening file for write: %d\n", stat);
   free((char *) buf8);
   free((char *) optr);
   return(-2);
} if (inp_img_ptr->file_format == 0) {
   for(i=0; i<80; i++)
      optr->nato_pat_hdr[i] = optr->std_file_hdr[i];
   optr->nato_pat_hdr[80] = '\0';
}
else {
   for(i=0; i<5119; i++)
      optr->nato_pat_hdr[i] = optr->nato_pat_hdr[i];

optr->nato_pat_hdr[5119] = '\0';

for(i=0; i<32; i++)
      optr->prm_nato[i] = inp_img_ptr->prm_nato[i];
} optr->prm_nato[0] = type;
optr->prm_nato[5] = 1; /* One image per bundle */
optr->prm_nato[6] = type;  /* Image order in bundle */
optr->prm_nato[9] = 1; /* Set up secondary header */ stat = write_buf8(optr, buf8);
if (stat < 0) {
   fprintf(stderr, "Error writing file: %d\n", stat);
   free((char *) buf8);
   free((char *) optr);
   return(-2);
} stat = close_sng_pattern(optr);
if (stat < 0)
   fprintf(stderr, "Error closing file: %d\n", stat);
```

```
        free((char *) buf8);

break;

default:
        free((char *) optr);

return(-3);
         } free((char *) optr);

return(1);
    }
    else
       return(-1);
} int write_proc_image16(inp_img_ptr, out_img, ot_file, format, type, write_flag)
struct uff_file_block   *inp_img_ptr;
float                   *out_img;
char                    ot_file[];
int                     format, type, write_flag;
{ int                 i, nsz, pat_num, stat, min_val, rows, cols;
    float               scale, vmn, vmx;
    short               *buf16;
    struct uff_file_block  *optr;

if (out_img != NULL && inp_img_ptr != NULL) {
       optr = (struct uff_file_block *) malloc(sizeof(struct uff_file_block));

clear_uff(optr);

rows = inp_img_ptr->size_dim[0];
       cols = inp_img_ptr->size_dim[1];

nsz = inp_img_ptr->pat_size;

for(i=0; i<8; i++)
          optr->pat_class_name[i] = inp_img_ptr->pat_class_name[i];

optr->pat_class_name[8] = '\0';

switch(format) {
         case 0:
       if (inp_img_ptr->file_format == 0) {
              for(i=0; i<80; i++)
                 optr->std_file_hdr[i] = inp_img_ptr->std_file_hdr[i];
          optr->std_file_hdr[79] = '\0';
       }
       else {
              for(i=0; i<80; i++)
                 optr->std_file_hdr[i] = inp_img_ptr->nato_pat_hdr[i];
          optr->std_file_hdr[79] = '\0';
       } init_image(optr, rows, cols, 16, 0, 0); /* Set up 16-bit STD output */ buf16 = (short *) malloc(nsz * sizeof(short));

/* $dir no_recurrence */
       for(i=0; i<nsz; i++)
          buf16[i] = (short) out_img[i];
```

```
        optr->write_mode   = write_flag;

stat = open_wrt_pattern(optr, ot_file);
        if (stat < 0) {
           fprintf(stderr, "Error opening file for write: %d\n", stat);
           free((char *) buf16);
           free((char *) optr);
           return(-2);
        } stat = write_buf16(optr, buf16);
        if (stat < 0) {
           fprintf(stderr, "Error writing file: %d\n", stat);
           free((char *) buf16);
           free((char *) optr);
           return(-2);
        } stat = close_sng_pattern(optr);
        if (stat < 0)
           fprintf(stderr, "Error closing file: %d\n", stat);

free((char *) buf16);

break;

case 1:
        clear_uff(optr);

init_image(optr, rows, cols, 16, 1, 0); /* Set up 16-bit NATO output */ buf16 = (short *) malloc(nsz * sizeof(short));

/* $dir no_recurrence */
        for(i=0; i<nsz; i++)
           buf16[i] = (short) out_img[i];

optr->write_mode   = write_flag;

stat = open_wrt_pattern(optr, ot_file);
        if (stat < 0) {
           fprintf(stderr, "Error opening file for write: %d\n", stat);
           free((char *) buf16);
           free((char *) optr);
           return(-2);
        } if (inp_img_ptr->file_format == 0) {
           for(i=0; i<80; i++)
              optr->nato_pat_hdr[i] = optr->std_file_hdr[i];
           optr->nato_pat_hdr[80] = '\0';
        }
        else {
           for(i=0; i<5119; i++)
              optr->nato_pat_hdr[i] = optr->nato_pat_hdr[i];

optr->nato_pat_hdr[5119] = '\0';

for(i=0; i<32; i++)
              optr->prm_nato[i] = inp_img_ptr->prm_nato[i];
        } optr->prm_nato[0] = type;
        optr->prm_nato[5] = 1; /* One image per bundle */
        optr->prm_nato[6] = type;   /* Image order in bundle */
```

```c
        optr->prm_nato[9] = 1; /* Set up secondary header */ stat = write_buf16(optr, buf16);
        if (stat < 0) {
           fprintf(stderr, "Error writing file: %d\n", stat);
           free((char *) buf16);
           free((char *) optr);
           return(-2);
        } stat = close_sng_pattern(optr);
        if (stat < 0)
          fprintf(stderr, "Error closing file: %d\n", stat);

free((char *) buf16);

break;

default:
        free((char *) optr);

return(-3);
         } free((char *) optr);

return(1);
    }
    else
       return(-1);
}
```

Fri Mar 22 15:44:55 1991  test_    .c                                                    Printed Tue Mar 26 12:36:05 1991  Page  1

```c
#include <stdio.h>
include <math.h> float       *a, *b;

main()
{
    int      i, k, nsz, num_reps;
    float    c = (float) 10.0;
    float    d, scale;
    float    *loc_a, *loc_b;

nsz = 65536;
    num_reps = 100;
    scale = 1.0 / (float) nsz;

a = (float *) malloc(nsz * sizeof(float));
    b = (float *) malloc(nsz * sizeof(float));

loc_a = a;
    loc_b = b;

for(k=0; k<num_reps; k++) {
       /* $dir no_recurrence */
       for(i=0; i<nsz; i++) {
       d = exp(i * scale);
       loc_a[i] = d;
       }

/* $dir no_recurrence */
       for(i=0; i<nsz; i++)
       loc_b[i] = loc_a[i] + i * scale;
    } exit(0);
}
```

APP-76

Fri Mar 22 08:27:15 1991  mean_ .c                                          Printed Tue Mar 26 12:36:04 1991  Page  1

```c
#include <stdio.h>
include <math.h> include <local/array.h> include "new_filter.h"

int mean_cross(org_image, prc_image, rows, cols)
float       *org_image;
float       *prc_image;
int         rows, cols;
{ int     is, j, k, nsz, stat;
    int     **idx;
    float   *loc_sum;
    float   scale;

nsz = rows * cols;

if (org_image != NULL && prc_image != NULL && nsz > 0) {
       stat = setup_mrf_storage_new(rows, cols);
       if (stat < 0) return(stat);

loc_sum = the_sum;
       idx = mrf_map->storage;

scale = 1.0 / (1.0 + NUM_SURROUND);

/* $dir no_recurrence */
       for(j=0; j<nsz; j++)
          loc_sum[j] = org_image[j];

for(is=0; is<NUM_SURROUND; is++)
           /* $dir no_recurrence */
       for(j=0; j<nsz; j++) {
          k = idx[is][j];
          loc_sum[j] += org_image[k];
       }

/* $dir no_recurrence */
       for(j=0; j<nsz; j++)
          prc_image[j] = loc_sum[j] * scale;

return(1);
    }
    else
       return(-1);
}
```

APP-27

```
Fri Mar 22 08:27:20 1991  media      .s.c                          Printed Tue Mar 26 12:36:04 1991  Page  1 include <stdio.h>
include <math.h> include <local/array.h> include "new_filter.h"

int median_cross(org_image, prc_image, rows, cols, error_tol, num_iter)
float          *org_image;
float          *prc_image;
int            rows, cols;
float          error_tol;
int            *num_iter;
{ int    cnt, i, j, nsz, stat;
    float  err_val, cur_err, err_old, temp;

nsz = cur_size;

if (org_image != NULL && prc_image != NULL && nsz > 0) {
      stat = setup_mrf_storage_new(rows, cols);
      if (stat < 0) return(stat);

cnt = 0;

*num_iter = cnt;

return(1);
    }
    else
       return(-1);
}
```

What is claimed is:

1. An image restoration apparatus for reducing image noise while preserving naturally occurring boundaries within a measurement field image of an object, the apparatus comprising:

a first memory having stored therein a first plurality of data values measured by a sensor which views an object of interest, the data values being representative of a measurement field image of the object;

a second memory for storing a second plurality of data values representative of a restoration field image transformed from the first plurality of data values;

a processor coupled to the first memory and the second memory, the processor relating the restoration field image with the measurement field image through a dynamical system equation derived from an energy function, the energy function being a function of both the restoration field image and the measurement field image and includes a surround term $E_s$ which represents local interactions within the restoration field image, the local interactions characterized by sigmoid-like functions, the processor receiving the first plurality of data values for the measurement field image from the first memory and iteratively solving the dynamical system equation to transform the first plurality of data values into the second plurality of data values of the restoration field image, the second plurality of data values representing a noise-reduced version of the measurement field image.

2. The image restoration apparatus of claim 1 wherein the sigmoid-like functions have the following form:

$$f(x) = \frac{1}{1 + \exp[-\beta x^n]}$$

where n is a number, $\beta$ is a gain variable, and x is derived from those locations of the restoration field image that participate in a given local interaction.

3. The image restoration apparatus of claim 2 wherein n=2.

4. The image restoration apparatus of claim 3 wherein $x = x_k - x_j$, where $x_k$ is a data value at a kth location in the restoration field image and $x_j$ is a data value at a jth location in the restoration field image, the jth location being within a local neighborhood of the kth location.

5. The image restoration apparatus of claim 1 wherein the energy function also contains a field coupling term $E_f$ which represents field interactions between the measurement field image and the restoration field image.

6. The image restoration apparatus of claim 5 wherein the field interactions are characterized by sigmoid-like functions.

7. The image restoration apparatus of claim 6 wherein the sigmoid-like functions characterizing the field interactions have the following form:

$$g(x) = \frac{1}{1 + \exp[-\beta y^n]}$$

where n is a number, $\beta$ is a gain variable, and y is derived from those locations of the restoration field image and the measurement field image that participate in a given field interaction.

8. The image restoration apparatus of claim 7 wherein n=2.

9. The image restoration apparatus of claim 8 wherein $y = y^R_k - y^M_k$, where $y^R_k$ is a data value at a kth location in the restoration field image and $y^M_k$ is a data value at a kth location in the measurement field image.

10. The image restoration apparatus of claim 5 wherein the field coupling term includes a field coupling coefficient which controls the field interactions between the measurement field image and the restoration field image.

11. The image restoration apparatus of claim 10 wherein the field coupling coefficient varies as a function of location within the restoration field image.

12. The image restoration apparatus of claim 5 wherein the field coupling term $E_f$ is:

$$\lambda_k \sum_k \frac{1}{1 + \exp[-\beta_1(x_k^M - x_k^R)^2]}$$

and the surround term $E_s$ is:

$$\sum_K \sum_{j \in N_K} \frac{1}{1 + \exp[-\beta_2(x_k^R - x_j^R)^2]}$$

where $\lambda_k$ is a field coupling coefficient specified for a location k, $\beta_1$ and $\beta_2$ are first and second gain variables, $x^M_k$ represents a data value at location k of the measurement field image, $x^R_k$ represents a data value at location k of the restoration field image, $x^R_j$ represents a data value at location j of the restoration field image, and $N_k$ defines a neighborhood for location k of the restoration field image.

13. The image restoration apparatus of claim 12 wherein $\lambda_k$ equals a specified constant for all values of k.

14. The image restoration apparatus of claim 1 wherein the restoration field image is a single plane of pixel data.

15. The image restoration apparatus of claim 1 wherein the measurement field image is a single plane of image data.

16. The image restoration apparatus of claim 1 wherein the processor employs a fixed point iteration technique to solve the dynamical system equation.

17. A computer-implemented method of reducing image noise while preserving naturally occurring boundaries within a measurement field image of an object, the method comprising:

storing in a memory a first plurality of data values measured by a sensor which views an object of interest, the data values being representative of the measurement field image of the object;

defining a relationship between a restoration field image and the measurement field image through a dynamical system equation derived from an energy function, the energy function being a function of both the restoration field image and the measurement field image and including a surround term which represents local interactions within the restoration field image, the local interactions characterized by sigmoid-like functions;

receiving the first plurality of data values of the measurement field image from the memory;

iteratively solving the dynamical system equation to transform the first plurality of data values into a second plurality of data values representative of the restoration field image, the second plurality of data values representing a noise-reduced version of the measurement field image; and storing the second plurality of signals of the restoration field image in the memory.

18. The method of claim 17 wherein there are a plurality of sensors, there being a respective plane of data values representing the object stored in the memory for each sensor.

19. An image restoration apparatus for reducing image noise while preserving naturally occurring boundaries within a measurement field image of an object, the apparatus comprising:

a view of an object of interest manifested as a first plurality of data values representative of a measurement field image of the object;

a memory having stored therein the first plurality of data value and for storing a second plurality of data values representative of a restoration field image transformed from the first plurality of data values; and a processor coupled to the memory and relating the restoration field image with the measurement field image through a dynamical system equation derived from an energy function, the energy function being a function of both the restoration field image and the measurement field image and including a surround term which represents local interactions within the restoration field image, the local interactions characterized by sigmoid-like functions, the processor receiving the first plurality of data values from the memory and iteratively solving the dynamical system equation to transform the first plurality of data value into the second plurality of data values, into the second plurality of data values representing a noise-reduced version of the measurement field image.

20. The image restoration apparatus of claim 19 wherein there are a plurality of sensors, each sensor measuring a respective plane of data values representing the object.

* * * * *